United States Patent Office 3,317,829
Patented May 2, 1967

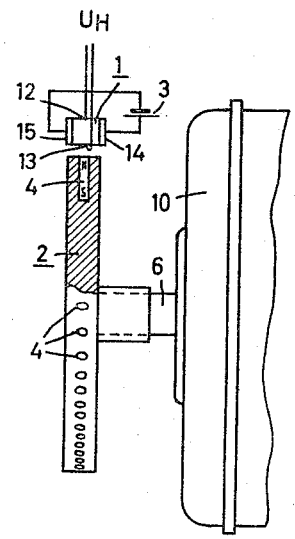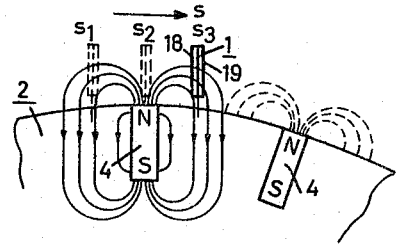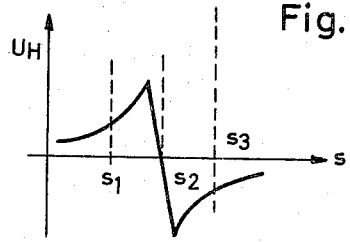
Fig. 1  Fig. 2  Fig. 3
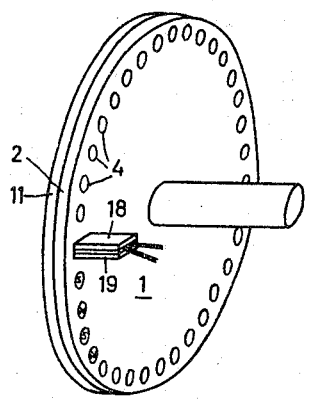
Fig. 4

3,317,829
TRANSLATING DEVICE FOR CONVERTING A MECHANICAL MAGNITUDE INTO AN ELECTRIC FREQUENCY
Friedrich Kuhrt, Nurnberg, and Heinrich Grosshans, Erlangen, Germany, assignors to Siemens-Schuckertwerke Aktiengesellschaft, Erlangen, Germany, a corporation of Germany
Filed Sept. 20, 1960, Ser. No. 57,336
Claims priority, application Germany, Sept. 23, 1959, S 65,064
4 Claims. (Cl. 324—69)

This invention relates to a translating device for converting a mechanical magnitude such as length, speed, or rotational speed into a corresponding electric magnitude.

Such mechanical-electrical translating devices are often required for measuring, controlling and regulating purposes. Thus, for example, it is usual to determine the rotating speed of a shaft by translating it, by means of a tachometer generator, into an analogous electric voltage. The voltage is then available for electric control and regulating purposes. However, the accuracy of such translating devices is limited. Auxiliary devices are necessary, and are often of considerable complexity when accurate proportionality between the magnitude of the tachometer voltage and the mechanical magnitude being measured or sensed is required.

The increasing demands with respect to accuracy of translating devices for measuring values have resulted in the progressive increase in use of digital-computing devices. In such devices, the mechanical magnitude is converted into a sequence of electric pulses of which either the absolute number, or their frequency of recurrence within a given time, is the measured output parameter, whereas the amplitude of the pulses is irrelevant for the measuring performance. The measuring accuracy of such devices can be increased at will.

Devices are known in which a length is measured by counting pulses. It is further known to represent the rotating speed of a shaft in terms of the frequency of a pulse sequence. In another known apparatus, a speed value, for example the speed of a moving machine part in a machine tool, is translated into an electric frequency proportional to the speed. For thus translating the original mechanical magnitude, mechanical inductive, capacitive and photoelectric pulse transmitters have been employed. In inductively and capacitively operating value transmitters, the amplitude of the pulses is dependent upon changes in magnetic or electric field strength. For that reason, it is infeasible to translate the measured quantity down to its zero value. In known apparatus employed to translate a linear or rotational speed, this disadvantage is eliminated by providing a magnetic field and also an ohmic semiconducting resistor, particularly of indium antimonide (InSb) whose resistance depends upon the magnetic field strength to which it is subjected, and which rotates relative to the magnetic field at the speed to be translated. A direct-current source is connected to the semiconducting resistor. During rotation of the magnetic field the direct voltage is modulated in such manner that the output voltage comprises a component amplitude whose frequency is proportional to the speed. The magnitude of the output voltage is independent of the field variation, and hence is also independent of the rotating speed. For this reason, a measuring operation at very small rotating speeds is also feasible.

In apparatus of the type just described, the Hall voltage occurring in semiconducting resistors can be utilized, aside from the variation in ohmic conductance of the magnetic-field responsive resistance body. A Hall voltage is generated in current-traversed semiconductor bodies located in a magnetic field having a flux direction perpendicular to the current-flow direction, the Hall voltage having a direction perpendicular to the plane defined by the current direction and the magnetic field direction.

In a known apparatus of this type, a permanent magnet of horseshoe configuration is used. This magnet is provided with a yoke of magnetizable material upon which a Hall plate is mounted in an air gap opposite a pole shoe. The Hall plate is rotated in the magnetic field or is so moved past the field that it is traversed by the field only in a direction normal to the plane of the plate. In another apparatus of this kind, the pulse transmitter is provided with a cylindrical, permanently magnetic middle leg, a cup to which a shaft is coaxially joined by a flange, and also a coaxial cover designed as a toothed disk. The Hall plate is disposed in the air gap between the cup and the cover disk so that the disk when rotating modulates the magnetic flux by the passage of the teeth. In this case, too, the Hall plate moves relatively to the magnetic fields so that the plate is traversed perpendicularly by the magnetic field lines.

It is an object of this invention to devise a mechanical-electrical translating apparatus which, for various purposes, is more advantageous than those heretofore available. Another, more specific object of the invention is to provide a translating device which furnishes a sequence of pulses from which not only the magnitude but also the direction of a mechanical motion can be deduced.

To this end, and for thus translating length, speed or other mechanical magnitude into the frequency of an electric current or voltage, we provide a disk or other circular carrier and mount a plurality of permanent magnets of the carrier in uniform peripheral distribution and uniform spacing from one another. We further provide the device with a magnetic-field responsive semiconducting resistance plate, or preferably a Hall-voltage generating plate so that it is located in the fields of the permanent magnets. It is essential to the present invention that the plane of the semiconductor plate is so oriented as to be defined by the magnetic axis of the one permanent magnet that, during operation, is juxtaposed to the plate, and by a line normal to the relative direction of motion between carrier and plate, i.e. normal to the tangential direction of the carrier at the location of the plate. During operation, the carrier is kept in rotation, relative to the stationary plate, at the speed which corresponds to mechanical magnitude to be translated, or the carrier is kept fixed, and the semiconductor plate is rotated about the carrier.

The permanent magnets may all have the same poling with respect to the periphery of the disk. In this case, when the plate approaches one of these magnets, an increasing voltage of a given direction is generated which, after passing through a maximum, passes through zero when this permanent magnet occupies a symmetrical position with respect to the plate. When the plate becomes subsequently progressively removed from the permanent magnet, a voltage having a maximum in the other direction is generated. Consequently, this pulse sequence permits a conclusion as to the direction of the mechanical motion. This result is not achieved by the known devices in which a Hall-voltage generating plate is arranged in perpendicular relation to the magnetic field axis, because in the latter devices the relative travel generates a Hall voltage which has only one maximum in either one or the other direction. In these known devices, particularly the one having a cup-shaped magnet, an alternating change of the magnetic flux occurs in the jacket or shell which constitutes a magnetic yoke whereby eddy currents are produced. If such a measuring apparatus is coupled, for example, with a machine whose deceleration behavior is to be measured, then the magnitude measured is erroneous, because of the power losses involved in the eddy-current formation. It is another object and achievement of the present invention to avoid such eddy-current generation and the deficiences resulting therefrom.

The invention will be further described with reference to the embodiments illustrated by way of example in the accompanying drawings, in which:

FIG. 1 illustrates the new translating device for measuring purposes coupled with the shaft of a machine. However, in FIG. 1, the position of the Hall plate is turned 90° about an axis perpendicular to the axis of carrier rotation, in order to show the electrical connections. The operative position is that shown in FIG. 2.

FIG. 2 illustrates a portion of the device of FIG. 1, on an enlarged scale, and is in a plane perpendicular to the shaft axis.

FIG. 3 is an explanatory graph indicating the voltage generated by the Hall plate of the translating device of FIGS. 1 and 2, in dependence upon the amount of rotary travel. FIGS. 2 and 3 are correlative.

FIG. 4 is a perspective illustration of another embodiment of a translating device according to the invention.

Figure 5:
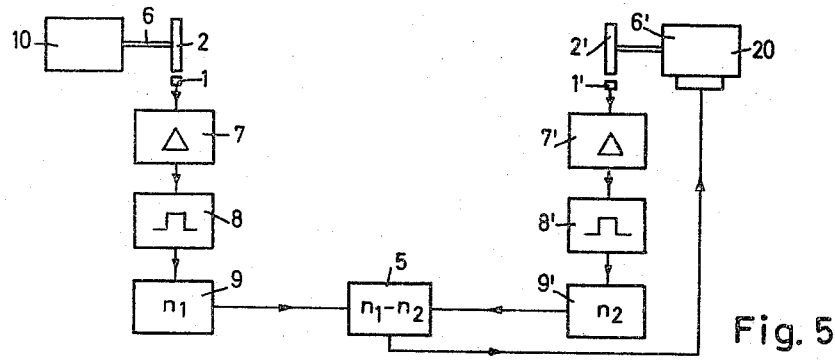
FIG. 5 is a schematic diagram relating to the use of translating devices according to the invention for synchronizing the speed of rotation of two machines.
Figure 6:
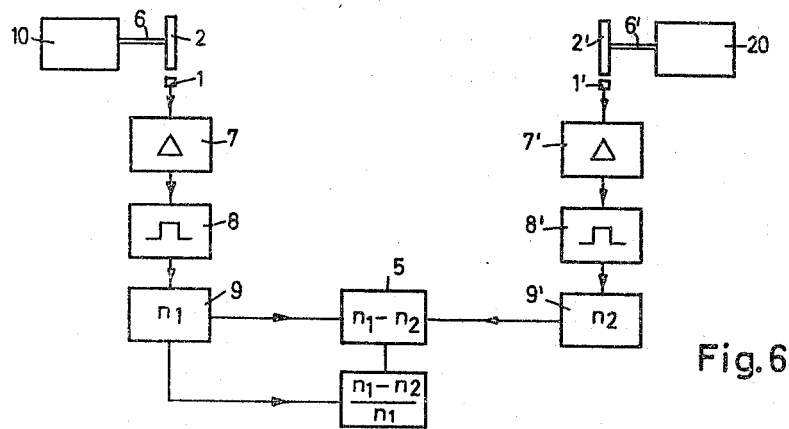
FIG. 6 is a schematic circuit diagram relating to the use of translating devices according to the invention for determining a quotient involving the rotating speeds of two electric motors.
Figure 7:
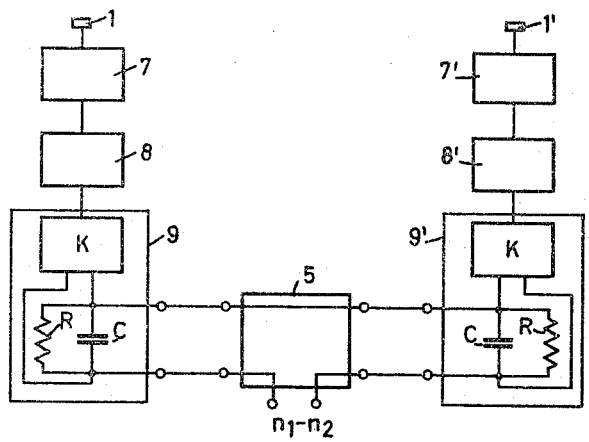
Figure 8:
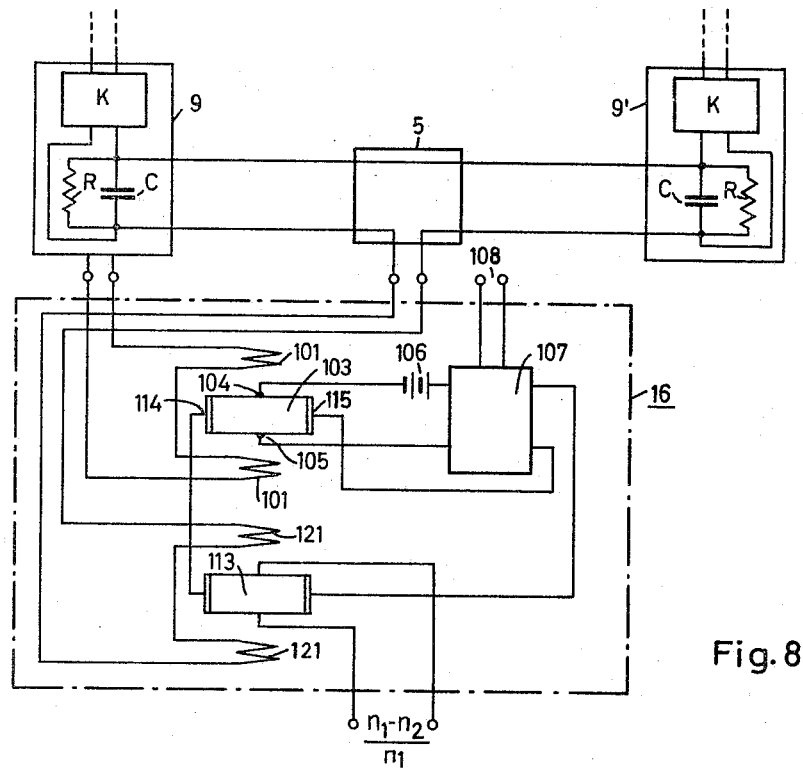
Figure 9:
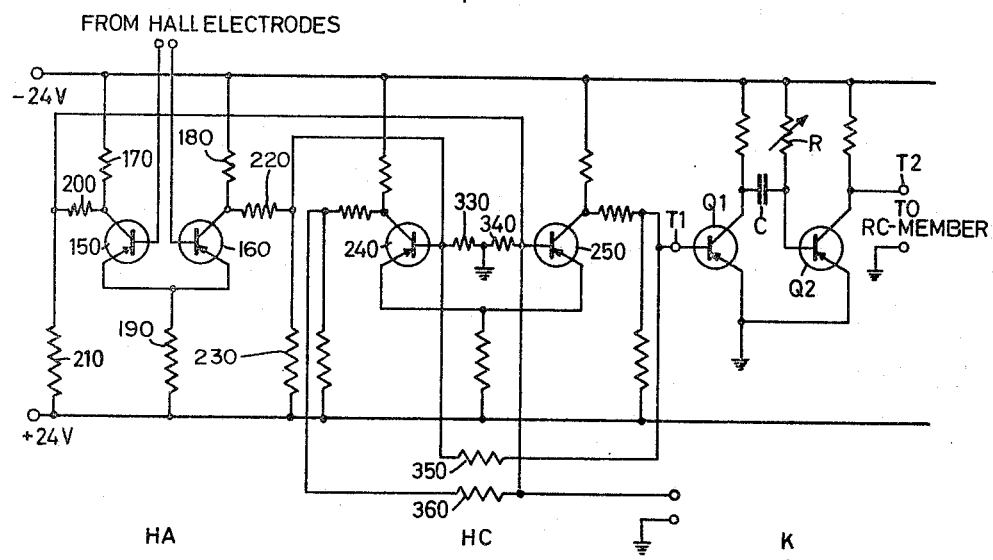

FIGS. 7, 8, and 9 illustrate more specific embodiments of the circuitry of FIGS. 5 and 6.

The device illustrated in FIGS. 1 to 3 is suitable for converting a mechanical magnitude such as velocity, rotating speed or length into the frequency of an electric voltage or current. The device in part comprises a semiconducting resistor 1 and electric field means. An alternating voltage is generated in the plate as a result of relative motion between the plate and the magnetic field device. As noted above, FIG. 2 shows the operative position of the Hall plate 1. The Hall plate 1 is turned in FIG. 1, to illustrate the electric connections. The semiconducting resistor 1, consisting of a thin wafer or plate, is located in a plane defined by the magnetic axis of a magnet that continually passes by the plate, and by a line perpendicular to the relative direction of motion. The direction of motion is indicated in FIG. 2 by an arrow $s$. Magnetic points of discontinuity are provided by a multiplicity of permanent magnets 4 embedded in disk 2, and distributed peripherally at uniform distances from each other. In the embodiment of FIGS. 1 and 2, the magnetic axes of the permanent magnets 4 extend in radial direction relative to the disk 2. However, these magnetic axes may also be parallel to the center axis of the disk, as illustrated in FIG. 4, described below.

The semiconducting resistor 1 in the illustrated embodiment comprises a Hall plate of generally rectangular shape. Two point or probe Hall electrodes 12, 13 are located midway on the two long edges respectively of the plate. The plate is further provided with two current supply terminals 14 and 15 which extend along the respective narrow edges of the plate. These terminals are connected with a direct-current source 3 of constant voltage. The disk 2 is coaxially mounted on the shaft 6 of the machine 10 whose speed is to be translated into a voltage of corresponding frequency. During rotation of the disk 2 relative to the stationary Hall plate 1, a voltage $U_H$ (FIG. 3) is generated between the Hall electrodes 12 and 13, this voltage having a frequency proportional to the rotating speed of the shaft 6.

The disk 2 preferably consists of non-magnetizable material such as aluminum, brass or insulating material. A relatively large number, for example, one hundred, of small permanent magnets 4 may be embedded in the desk. During rotation, the stationary Hall plate 1 senses the varying magnetic flux. Independently of the particular poling of the permanent magnet, the rotation of the disk 2 causes the Hall plate 1 to generate a voltage with positive and negative maximum values.

The graph of FIG. 3 indicates a typical voltage curve $U_H$ as a function of the travelling distance $s$, with respect to the relative travel of the Hall plate 1 and one of the permanent magnets 4, from a point $s_1$ through a point $s_2$ to point $s_3$ as illustrated in FIG. 2. When the Hall plate, during this relative travel, approaches the permanent magnet, an increasing positive voltage is generated which, after reaching a maximum, passes through zero at the relative travel position $s_2$. When the Hall plate thereafter moves away from the magnet, the voltage increases toward a negative maximum. Consequently, the magnetic fields acting upon the Hall plate in alternating sequence, and originating from magnets which are all poled in the same sense, produces at the Hall electrodes 12 and 13 a voltage of alternating polarity. The pulse sequence, therefore, permits a conclusion as to the direction of mechanical motion. The frequency of the generated voltage is proportional to the rotating speed, and the accuracy is independent of the particular magnitude or range of that speed.

As shown in FIG. 4, the permanent magnets 4 may also be embedded so as to have their respective axes extend parallel to the axis of rotation. Furthermore, as also shown in FIG. 4, the polarity NS-SN of these magnets may alternate from magnet to magnet. In this case, it is preferable to provide the carrier disk 2 with another disk 11 of soft iron or the like highly permeable magnetizable material. The magnetizable plate 11, placed in face-to-face contact with the carrier plate proper, is particularly advantageous when the permanent magnets are given alternately different polarity. The disk 11, which may be replaced by a ring, ensures that the magnetic flux of the permanent magnets issues from the carrier plate only toward that side at which the Hall plate 1 is located. The Hall plate 1 is preferably embedded between two ferrite plates 18 and 19. In comparison with the apparatus as shown in FIG. 1, twice the number of permanent magnets is needed in a device of the type shown in FIG. 4, for generating the same number of pulses for a given speed.

It is understood that the device of FIG. 4 can be used with magnets of the same polarity, and with or without plate 11.

If, as in the embodiment of FIG. 1, a large number of voltage pulses, for example one hundred pulses, are generated by a single rotation of the carrier, then the subdivision of such single rotation is generally satisfactory for most purposes. A pulse-counting device can then be connected with the circuit of the Hall electrodes 12, 13, and the counting device may then be rendered active by a particular control pulse for only a given small interval of time. In this manner, the particular speed can be determined for very small portions of a single rotation. For this purpose, the voltage issuing from the Hall generator 1 is preferably amplified in a pre-amplifier 7 (FIG. 5) and then applied to a square-wave generating stage 8 which converts the input pulse into a voltage pulse of rectangular wave configuration. From the stage 8, constituted for example by a conventional amplifier of the switching type, the pulses are applied to a pulse counter 9, likewise conventional and readily available.

In the arrangement shown in FIG. 5, a translating device, constructed according to the invention, is employed for synchronizing two machines 10 and 20. Coupled with each of these machines is a carrier member 2 or 2', which cooperates with the stationary Hall plate 1 or 1'. For instance, Hall plate 1' passes a signal through a pre-amplifier 7' and a square-wave shaping stage 8' to a counting device 9'. The two output magnitudes $n_1$ and $n_2$ indicative of the respective speeds of machine rotation are applied to a computer stage 5, and the differential result is used for controlling the speed of one of the two machines, for example the machine 20, in the sense and by the magnitude required to maintain synchronism between the two machines.

The conventional computer stage 5 can also be designed or set to determine the ratio $n_1/n_2$.

The apparatus of FIG. 6 serves for determining a quotient involving the rotating speeds of two motors, each motor 10 and 20 being provided with a magnet carrier 2 or 2' and a stationary Hall plate 1 or 1'. The two translating devices in each of FIGS. 5 and 6 are identical. The pulses are counted in the counting stages 9 and 9' for a given interval of time, and the two results are supplied to the computing stage in which the difference of the two rotating speeds $n_1-n_2$ is determined. This difference is then applied to the computing stage 16 for forming the quotient $$\frac{n_1-n_2}{n_1}$$

For counting the pulses and determining the rotating speed, available, commercial components of electronic computers can be employed, and the showing in FIGS. 5 and 6 is sufficient for persons skilled in the art.

FIGS. 7 and 8 illustrate specific embodiments of the circuitry of FIGS. 5 and 6, respectively. Suitable commercial components sold by Siemens may be utilized as the amplifier stages, the switching stages and the pulse counter. Thus, for example, the amplifier stages 7 and 7' may comprise the Siemens, the Hall-generator adapter stage. The switching stages 8 and 8' may comprise, for example, the Siemens Hall-generator flip-flop or trigger stage. The pulse counters 9 and 9' may each comprise, for example, a Siemens trigger circuit, designated K in the figures. Each trigger circuit is connected to an RC member. Any suitable amplifier known in the art may be utilized as the amplifier stages 7 and 7'. Any suitable switching or flip-flop circuit known in the art may be utilized as the switching stages 8 and 8'. Any suitable pulse counter or trigger circuit known in the art may be utilized as the pulse counters 9 and 9'.

In the embodiment shown in FIG. 6, the formation of the rotary-speed voltage $n_1-n_2$ may be effected in analogy to the difference-forming network shown in FIG. 5. The formation of the quotient $$\frac{n_1-n_2}{n_1}$$

can be carried out in accordance with the disclosure in coassigned application Serial No. 713,266, filed February 4, 1958, now U.S. Patent Number 3,003,698, by Kuhrt and Brauenersreuther.

The apparatus 16 illustrated in FIG. 8 employs the device shown in FIG. 4 of said copending application Ser. No. 713,266, now U.S. Patent Number 3,003,698, for obtaining an output voltage equal or proportional to a ratio of two voltages $U'/U$. In the instant case, $U'=n_1-n_2$, and $U=n_1$. The difference voltage $n_1-n_2$ is contributed by both pulse counter devices 9 and 9' through computer stage 5. The voltage $n_1$ is contributed by device 9. As will be explained below, and as explained in said copending application, the reciprocal value $1/n_1$ is produced as the output current of the amplifier 107. This current is passed through the semiconductor plate 113 of a second Hall generator. The numerator voltage $n_1-n_2$ is impressed upon the magnetic field windings 121 of the second Hall generator. A voltage proportional to the quotient $$\frac{n_1-n_2}{n_1}$$

is thus produced across the Hall electrodes of the semiconductor 113.

The reciprocal value $1/n_1$ is produced as follows. The voltage $n_1$ is supplied from pulse counter 9 to the field winding 101 of a magnetic-field producing device. A semiconductor 103 having Hall electrodes 104, 105, is thus subjected to the magnetic field. The Hall electrodes 104 and 105 are connected in the input circuit of the amplifier 107 through a direct-current source 106 of constant voltage. The source 106 is poled in opposition to the Hall voltage $U_H$ produced by the semiconductor 103. Power is supplied to the amplifier through terminals 108.

Obviously, the said reciprocal value $1/n_1$, so obtained, is available for all automatic multiplying operations, viz. to obtain the value $n/n_1$, for example.

FIG. 9 illustrates suitable circuitry for the amplifier or adapter stage 7 or 7', designated HA in FIG. 9, for the switching stage 8, designated HC in FIG. 9, and for the trigger stage 9 or 9', designated K in FIG. 9.

The adapter stage HA comprises two transistors 150, 160 with respective collector resistors 170, 180 and a common resistor 190. The Hall voltage of the Hall plate 5 is imposed upon the respective base electrodes of the two transistors. Connected between the collector of transistor 150 and the common emitter resistor 190 is a voltage divider comprising two resistors 200 and 210. A corresponding voltage divider, comprising resistors 220 and 230, is connected between the collector of transistor 160 and the common emitter resistor 190. The output signals of the adapter stage are issued from these two voltage dividers to the trigger stage, which comprises two transistors 240 and 250. The circuitry of the trigger stage, in principle, corresponds to that of the adapter stage, except that feedback paths are added, consisting of base-circuit resistors 330, 340, and feedback resistors 350, 360. The degree of feedback coupling is so dimensioned that transistors 240 and 250 have only two stable operating conditions, and hence operate jointly as a bistable trigger amplifier. The adapter stage and trigger stage are designed as push-pull amplifiers in order to have each signal available with any desired polarity.

The trigger stage K comprises two transistors Q1, Q2, intercoupled by an RC member whose capacitor C has fixed capacitance and whose resistor R is adjustable. When a signal appears at the input terminal T1, connected to the base of the first transistor Q1, the voltage at the capacitor C declines to zero. During this interval, a rectangular wave pulse appears at the output terminal T2 connected to the collector of the second transistor Q2. This rectangular pulse terminates at the moment when the capacitor voltage has declined to zero.

The illustrated circuit connections are exemplary only. Other known circuits may be employed for obtaining or performing operations upon or governed by the difference $n_1-n_2$.

The performance is as follows:

The voltage generated by the Hall generators, approximately or roughly of sinusoidal shape is amplified in the matching (adapter) stage 7 and is then supplied to the trigger stage 8 which produces a rectangular signal wave either only during the positive or only during the negative half-waves of the voltage. The average value of the rectangular signals does not yet yield a criterion proportional to the rotating speed, because this average value does not change when the frequency is changed. For that reason, the rectangular voltage is supplied to a trigger or flip-flop stage K whose output pulses possess a width proportional to the frequency of the Hall voltage. The pulses generated in the relaxation trigger are integrated in the following RC-stage. Consequently, the RC-stage forms the temporal average value of the pulse voltage. The formation of the difference voltage $n_1-n_2$ proportional to the rotating speeds being measured is effected by connecting the two output voltages of the respective RC-stages in series opposition with each other.

Obviously, the semiconductor plate 1 of FIG. 1 can be mounted upon a circular cage or arm and rotated by a motor, while disk 2, situated within or outside of the cage or arm, remains stationary.

Although the disclosed embodiment of FIG. 1 employs the Hall voltage as the sensing phenomena, it is feasible to employ the magnetic-field induced variations in resistance by connecting the pre-amplifier 7 into the circuit of the cell 3 that supplies current to the semiconductor 1. Although it is more advantageous to do so, the disks need not be provided with separate permanent magnets, but may comprise magnetizable material of sufficient remanence so that the necessary magnetic disk continuities of alternating plurality can be produced by correspondingly magnetizing the carrier plate or portions of the plate. Such materials and operation would be similar to the performance of a magnetic tape recorder in which magnetic signals or discontinuities are produced by correspondingly magnetizing a layer or coating of suitable ferro-magnetic material.

We claim:

1. An inductive translating device for converting a mechanical magnitude into a frequency of an electric magnitude, comprising resistance plate means of semiconductor material, carrier means having an axis, drive means coupled to said carrier means for rotating it about said axis at a speed relative to said plate means which is correlative with the mechanical magnitude to be translated, a plurality of permanent magnets carried on a face of said carrier and distributed thereabout at uniform peripheral distances, the magnetic axes of the permanent magnets being parallel to the axis of rotation, the magnets having alternately reversed magnetic poling, and a plate of soft iron fastened on the carrier means on a face thereof opposite that on which the magnets are carried, circuit connections attached to said semiconductor plate for providing current in said plate at opposing edges thereof and a periodic output voltage at opposing edges thereof, said plate being mounted near the travel path of said magnet to be subjected to the magnetic fields of said respective magnets during rotation of said carrier means, said plate being located in a plane defined by the magnetic axis of each permanent magnet when at the point closest to said plate during said rotation and by a line perpendicular to the tangential direction of carrier travel at said point.

2. Apparatus for comparing the speeds of rotation of at least two rotating devices, said apparatus comprising inductive translating devices for converting each of said speeds into corresponding frequencies of an electrical magnitude, each of said devices comprising resistance plate means of semiconductor material, carrier means having an axis, drive means coupled to said carrier means for rotating it about said axis at a speed relative to said plate means which is correlative with the rotational speed to be translated, a plurality of permanent magnets mounted on said carrier and distributed thereabout at uniform distances, circuit connections attached to said semiconductor plate at opposing edges thereof for providing current in said plate and a periodic output voltage at opposing edges thereof, said plate being mounted near the travel path of said magnet to be subjected to the magnetic fields of said respective magnets during rotation of said carrier means, said plate being located in a plane defined by the magnetic axis of each permanent magnet when at the point closest to said plate during said rotation and by a line perpendicular to the tangential direction of carrier travel at said point; pulse counter means connected to the periodic output voltage circuit connections of each of the semiconductor plates; and comparator means connected to said pulse counter means for determining a function of the speeds of rotation.

3. Apparatus for comparing the rotational speeds of at least two rotating devices, said apparatus comprising inductive translating devices for converting each of said speeds into a corresponding frequency of an electrical parameter, each of said translating devices comprising a carrier rotatable about an axis and operatively connected for axial rotation at a speed correlative with one of said rotating speeds to be compared, a plurality of permanent magnets mounted on said carrier and distributed discontinuously circumferentially thereof at uniform distances, a resistance plate of semiconductor material, circuit connections attached thereto at opposing edges thereof for providing current in said plate and a periodic output voltage at opposing edges thereof, said plate being mounted near the travel path of said carrier to be subjected to the magnetic fields of said respective magnets during rotation of said carrier, said plate being located in a plane defined by the magnetic axis of each magnet when at the point closest to said plate during carrier rotation and by a line perpendicular to the tangential direction of carrier travel at said point; pulse counter means connected to the periodic output voltage circuit connections of each of the semiconductor plates; and comparator means connected to said pulse counter means for determining a function of the speeds of rotation.

4. Apparatus for comparing the rotational speeds of at least two rotating devices, said apparatus comprising inductive translating devices for converting each of said speeds into a corresponding frequency of an electrical parameter, each of said translating devices comprising Hall voltage semiconductor plate means, carrier means having an axis, drive means coupled to said carrier means for rotating it about said axis at a speed relative to said plate means which is correlative with the rotational speed to be translated, a plurality of permanent magnets mounted on said carrier and distributed thereabout at uniform distances, current supply electrodes for said plate establishing a current axis in said plate, Hall voltage electrode means for said plate at opposing edges thereof, and circuit connections to said Hall electrode means to withdraw a periodic output voltage at opposing edges thereof, said plate being mounted near the travel path of said magnets to be subjected to the magnetic fields of said respective magnets during rotation of said carrier, said plate being located in a plane perpendicular to the tangential direction of carrier travel and closer to one magnetic pole of each magnetized region than the other; pulse counter means connected to the periodic output voltage circuit connections of each of the semiconductor plates; and comparator means connected to said pulse counter means for determining a function of the speeds of rotation.

References Cited by the Examiner

UNITED STATES PATENTS

| 2,387,901 | 10/1945 | Haverstick | 324—69 X |
| 2,493,028 | 1/1950 | Putt | 324—70 X |
| 2,512,325 | 6/1950 | Hansen | 324—45 X |
| 2,559,849 | 7/1951 | Covert | 324—70 |
| 2,866,013 | 12/1958 | Reis. | |
| 2,924,633 | 2/1960 | Sichling | 324—45 X |
| 2,945,993 | 7/1960 | Kuhit | 324—45 X |
| 2,946,955 | 7/1960 | Kuhit | 324—45 X |
| 2,956,209 | 10/1960 | Kuhit et al. | 324—45 X |
| 2,978,545 | 4/1961 | Howling. | |
| 2,989,690 | 6/1961 | Cook | 324—69 X |
| 3,046,361 | 7/1962 | Wiehl. | |
| 3,123,725 | 3/1964 | Nieda. | |

WALTER L. CARLSON, *Primary Examiner.*

LLOYD McCOLLUM, *Examiner.*

A. E. RICHMOND, M. J. LYNCH, *Assistant Examiners.*